(12) United States Patent
Paczkowski et al.

(10) Patent No.: US 9,767,566 B1
(45) Date of Patent: Sep. 19, 2017

(54) MOBILE THREE-DIMENSIONAL MODEL CREATION PLATFORM AND METHODS

(71) Applicant: Sprint Communications Company L.P., Overland Park, KS (US)

(72) Inventors: Lyle W. Paczkowski, Mission Hills, KS (US); James V. Ralston, Lenexa, KS (US); Dale S. Schempp, Lenexa, KS (US); Jennifer P. Tarwater, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 74 days.

(21) Appl. No.: 14/476,725

(22) Filed: Sep. 3, 2014

(51) Int. Cl.
| | |
|---|---|
| *G06K 9/00* | (2006.01) |
| *G06T 7/00* | (2017.01) |
| *H04N 1/00* | (2006.01) |
| *H04N 13/02* | (2006.01) |
| *G06Q 10/06* | (2012.01) |
| *H04W 4/02* | (2009.01) |
| *G05D 1/02* | (2006.01) |
| *H04W 88/02* | (2009.01) |

(52) U.S. Cl.
CPC ......... *G06T 7/0075* (2013.01); *G05D 1/0251* (2013.01); *G06Q 10/06313* (2013.01); *H04N 1/00204* (2013.01); *H04N 13/0275* (2013.01); *H04W 4/026* (2013.01); *G05D 2201/0207* (2013.01); *G06T 2207/10028* (2013.01); *H04W 88/02* (2013.01)

(58) Field of Classification Search
CPC ........ G06T 7/0075; G06T 2207/10028; G05D 1/0251; H04W 4/026; H04N 13/0275; H04N 1/00204; G06Q 10/06313; G05B 2201/0207
See application file for complete search history.

(56) References Cited

U.S. PATENT DOCUMENTS

| | | | | |
|---|---|---|---|---|
| 3,982,952 A | * | 9/1976 | Dumbaugh, Jr. | ....... C03C 3/253 501/42 |
| 5,742,335 A | * | 4/1998 | Cannon | .................. H04N 7/181 348/135 |

(Continued)

OTHER PUBLICATIONS

Wang et al. "Window Detection from Mobile LiDAR Data", IEEE, 2010.*

(Continued)

*Primary Examiner* — Aaron W Carter (57) ABSTRACT

A method of analyzing the dimensions of an interior. The method comprises capturing a first image of the interior with a first camera of a mobile communication device and capturing a second image of the interior with a second camera of the mobile communication device. The method further comprises analyzing the first image and the second image by the mobile communication device and, based at least in part on the analysis of the first image and the second image, determining a three-dimensional model of the interior. The method further comprises transmitting a transaction by a radio transceiver of the mobile communication device, wherein the transaction is based on the three-dimensional model of the interior and wherein the transaction is one of an insurance claim estimate, a contractor material order, or a real-estate broker listing.

19 Claims, 7 Drawing Sheets

(56) References Cited

U.S. PATENT DOCUMENTS

| | | | | |
|---|---|---|---|---|
| 5,842,148 A * | 11/1998 | Prendergast | G01M 5/0033 | 702/34 |
| 6,442,292 B1 * | 8/2002 | Otani | G01C 21/005 | 348/E13.014 |
| 8,345,953 B2 | 1/2013 | Stevens et al. | | |
| 8,774,525 B2 * | 7/2014 | Pershing | G06Q 10/06 | 382/100 |
| 8,937,646 B1 * | 1/2015 | Baldwin | H04N 13/0011 | 348/42 |
| 8,994,726 B1 * | 3/2015 | Furukawa | G06T 17/10 | 345/420 |
| 8,996,234 B1 * | 3/2015 | Tamari | G08G 1/20 | 701/123 |
| 9,571,757 B2 * | 2/2017 | Shin | H04N 5/33 | |
| 9,613,423 B2 * | 4/2017 | Dixon | H04N 5/33 | |
| 2003/0174208 A1 * | 9/2003 | Glukhovsky | A61B 1/041 | 348/131 |
| 2004/0056200 A1 * | 3/2004 | Rothenfusser | G01N 25/72 | 250/341.1 |
| 2004/0213459 A1 * | 10/2004 | Ishimaru | G06K 9/0063 | 382/191 |
| 2006/0133650 A1 * | 6/2006 | Xie | B41J 11/009 | 382/108 |
| 2006/0207325 A1 * | 9/2006 | Kataoka | G01N 21/4738 | 73/335.01 |
| 2006/0229774 A1 * | 10/2006 | Park | G05D 1/0238 | 701/23 |
| 2007/0030348 A1 * | 2/2007 | Snyder | G01C 3/08 | 348/135 |
| 2007/0133866 A1 * | 6/2007 | Chang | G06K 9/00 | 382/159 |
| 2009/0006185 A1 * | 1/2009 | Stinson | G06Q 10/10 | 705/306 |
| 2009/0046934 A1 * | 2/2009 | Beato | H04N 1/203 | 382/232 |
| 2009/0046940 A1 * | 2/2009 | Beato | G06F 17/3028 | 382/249 |
| 2009/0050540 A1 * | 2/2009 | Imai | B07C 5/3425 | 209/580 |
| 2009/0109240 A1 * | 4/2009 | Englert | G06T 19/006 | 345/633 |
| 2009/0150330 A1 * | 6/2009 | Gobeyn | G06Q 30/0269 | |
| 2009/0153925 A1 * | 6/2009 | Beato | H04N 1/00002 | 358/537 |
| 2009/0179734 A1 * | 7/2009 | Do | G06F 17/30879 | 340/5.8 |
| 2009/0208106 A1 * | 8/2009 | Dunlop | G06K 9/00664 | 382/173 |
| 2009/0231425 A1 * | 9/2009 | Zalewski | H04N 7/18 | 348/142 |
| 2009/0265193 A1 * | 10/2009 | Collins | G06Q 30/0185 | 705/4 |
| 2010/0076881 A1 * | 3/2010 | O'Grady | G06Q 40/00 | 705/35 |
| 2010/0194860 A1 * | 8/2010 | Mentz | H04M 1/0264 | 348/47 |
| 2011/0243450 A1 * | 10/2011 | Liu | G06K 9/00577 | 382/190 |
| 2012/0038902 A1 * | 2/2012 | Dotson | G01S 17/023 | 356/4.01 |
| 2012/0231424 A1 * | 9/2012 | Calman | G09B 25/04 | 434/72 |
| 2013/0046648 A1 * | 2/2013 | Calman | G06Q 30/08 | 705/26.3 |
| 2013/0346020 A1 * | 12/2013 | Pershing | G06Q 10/06 | 702/156 |
| 2014/0225988 A1 * | 8/2014 | Poropat | G01S 17/89 | 348/46 |
| 2014/0240313 A1 * | 8/2014 | Varga | G06T 19/006 | 345/419 |
| 2014/0270492 A1 * | 9/2014 | Christopulos | G06K 9/00637 | 382/159 |
| 2014/0278060 A1 * | 9/2014 | Kordari | G01C 21/206 | 701/422 |
| 2014/0368373 A1 * | 12/2014 | Crain | G01S 5/02 | 342/5 |
| 2014/0375493 A1 * | 12/2014 | Weisenburger | G01S 19/48 | 342/357.3 |
| 2015/0042640 A1 * | 2/2015 | Algreatly | H04N 9/3185 | 345/419 |
| 2015/0145883 A1 * | 5/2015 | Marti | G09G 3/20 | 345/592 |
| 2015/0186953 A1 * | 7/2015 | Gross | G06Q 30/0643 | 705/14.58 |
| 2015/0213315 A1 * | 7/2015 | Gross | G06Q 30/0643 | 382/159 |
| 2015/0248745 A1 * | 9/2015 | Chen | G06T 5/003 | 382/154 |
| 2015/0294511 A1 * | 10/2015 | Nishioka | G06T 15/06 | 345/420 |
| 2015/0331105 A1 * | 11/2015 | Bell | G01S 17/026 | 356/4.01 |
| 2015/0348580 A1 * | 12/2015 | van Hoff | G11B 19/20 | 348/38 |
| 2016/0007849 A1 * | 1/2016 | Krueger | A61B 3/113 | 600/301 |
| 2016/0027051 A1 * | 1/2016 | Gross | G06Q 30/0256 | 705/14.54 |
| 2016/0048934 A1 * | 2/2016 | Gross | G06K 9/00637 | 705/313 |
| 2016/0055268 A1 * | 2/2016 | Bell | G06F 17/5004 | 703/1 |
| 2016/0092959 A1 * | 3/2016 | Gross | G06T 7/0008 | 705/26.62 |
| 2016/0116995 A1 * | 4/2016 | Wilson | G06F 3/038 | 345/157 |
| 2016/0253044 A1 * | 9/2016 | Katz | G06F 3/017 | |

OTHER PUBLICATIONS

Dokmanic et al. "Acoustic Echoes Reveal Room Shape", Jul. 2013.*

Emspak, Jesse "Your Cellpone Could Be a Sonar Device", NBC News, Jun. 2013.*

"HTC Evo 3D", Wikipedia, https://en.wikipedia.org/wiki/HTC_Evo_3D, retrieved Apr. 28, 2016, 3 pages.

"Sharp Aquos SH-12C Phone: 3D Dual Cameras & Gingerbread", http://www.phonesreview.co.uk/2011/05/12/sharp-aquos-sh-12c-phone-3d-dual-cameras-gingerbread/, Phones Review, retrieved Apr. 28, 2016, 8 pages, published May 12, 2011.

"LG Optimus 3D", Wikipedia, https://en.wikipedia.org/wiki/LG_Optimus_3D, retrieved Apr. 28, 2016, 4 pages.

Madrigal, Alexis C., "The 3D Future of Your Smartphone Camera", http://www.theatlantic.com/technology/archive/2014/03/the-3d-future-of-your-smartphone-camera/284386/, The Atlantic, retrieved Apr. 28, 2016, 6 pages, Published Mar. 13, 2014.

Prigg, Mark, "Turn your mobile into a 3D camera: App transforms phone snaps into images that seem to pop out of the screen", http://www.dailymail.co.uk/sciencetech/article-2473177/Turn-mobile-3D-camera-App-transforms-phone-snaps-images-pop-screen.html, Daily Mail Online, retrieved Apr. 28, 2016, 3 pages, Published Oct. 24, 2013.

* cited by examiner

MOBILE THREE-DIMENSIONAL MODEL CREATION PLATFORM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may support installation of powerful software packages that may be referred to as applications or more simply 'apps'. As powerful semiconductors are reduced in size and cost, mobile communication devices are becoming progressively more powerful and able to execute increasingly sophisticated and powerful applications. Some applications that execute on mobile communication devices promote efficient business transactions.

Robots are hybrid devices that incorporate computers and communication devices with mechanical actuators controlled by the computers. Robots may be used in factories to perform repetitive tasks precisely and quickly. In the future, robots may be used in personal living environments, for example to provide companionship to persons living alone such as aged widows and to provide help to aged persons.

SUMMARY

In an embodiment, a method of analyzing the dimensions of an interior is disclosed. The method comprises capturing a first image of the interior with a first camera of a mobile communication device and capturing a second image of the interior with a second camera of the mobile communication device. The method further comprises analyzing the first image and the second image by the mobile communication device and, based at least in part on the analysis of the first image and the second image, determining a three-dimensional model of the interior. The three-dimensional model comprises estimates of the length, breadth, and depth of the surfaces of the interior and a designation of a material of the surfaces of the interior. The method further comprises, based on the estimates of the length, breadth, and depth of the surfaces of the interior and the designation of the material of the surfaces of the interior, building by the mobile communication device a transaction that is one of an insurance claim for replacement of damage in the interior, a contractor remodeling bid for remodeling at least some of the interior, a detailed real-estate listing. The method further comprises transmitting the transaction by a radio transceiver of the mobile communication device.

In another embodiment, a mobile communication device is disclosed. The mobile communication device comprises a radio frequency transceiver, a processor, a memory, a first camera, a second camera, an orientation sensor, wherein the orientation sensor is configured to determine a physical orientation of the mobile communication device, and an application stored in the memory. When executed by the processor, the application develops a three-dimensional model of a location based on analyzing at least a first image captured by the first camera, at least a second image captured by the second camera, and an orientation indication produced by the orientation sensor.

In an embodiment, a robot is disclosed. The robot comprises a motion actuator, a processor, a memory, a first camera, a second camera, an orientation sensor, and an application stored in the memory. When executed by the processor, the application develops a three-dimensional model of a location based on analyzing at least a first image captured by the first camera, at least a second image captured by the second camera, and an orientation indication produced by the orientation sensor, maps a plurality of routes of movement of the robot within the location based on the three-dimensional model of the location, and controls the motion actuator to move the robot within the location based on a least one of the plurality of routes of movement.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mobile communication device that autonomously senses an environment such as an interior of a room, analyzes the sensor data, and builds a three-dimensional model of the environment based on the analysis. The three-dimensional model may estimate length, breadth, and depth of surfaces of the interior and identify materials of surfaces of the interior. This three-dimensional model may be used by special purpose applications that may be executed on the device. For example a painting application may be installed on the device and may use the three-dimensional model to calculate or estimate a quantity of paint needed to paint the wall surfaces of the environment, such as the interior of the room. The application may allow a pre-defined amount of extra margin in estimating the needed quantity of paint to assure that when painting the room the paint doesn't run out before the painting job is completed. The painting application could send an order to purchase the paint to a paint store via a wireless communication link. The painting application could build a bid for a painting sub-contracting job based on the three-dimensional model, based on the quantity of paint estimated to be needed, based on cost of the selected paint and provide the bid while the painting contractor was standing in the subject interior, for example in the home of a home owner remodeling his or her home.

Other applications may be installed on the mobile communication device that rely on the three-dimensional model of an environment. An insurance application could use the three-dimensional model of an environment to support an insurance claim filing. A landscaping contractor could use the three-dimensional model of an environment, for example a back yard of a property, to support choices of plants and volumes of mulch.

In an embodiment, a robot may be built incorporating the system for developing a model of an interior described above. A software application executing in the robot may use the three-dimensional model to perform an analysis to autonomously identify one or more paths for moving through the environment, for example entering a living room, passing between two couches, turning at the end of the couch to go through a doorway into a different room. The robot may use the three-dimensional model to identify objects inside of objects, for example to identify eyeglasses inside of a cardboard box, for use in helping a human being find objects he or she may have misplaced.

In an embodiment, the mobile communication system may comprise two cameras. The two cameras may take a sequence of pictures, and an analysis program may process the sequence of images to determine a distance to different points in the environment and to use that distance information to generate a three-dimensional model of the environment, for example a three-dimensional model of an interior room. Because the cameras may be separated from each other by a known distance, their respective pictures or images would have slight differences of perspective that could be used, with the known distance of separation between the cameras, to provide a kind of depth perception and to infer distance to surfaces of the environment. In an embodiment, the mobile communication device may further comprise a three axis accelerometer that can be used to determine a position of the mobile communication device relative to spatial references. Said in other words, the three axis accelerometer can be used to determine the acceleration of the mobile communication device in translation in each of three orthogonal axes—for example translation along an X-axis, translation along a Y-axis, and translation along a Z-axis. This information could be used in combination with the analysis of the images from the two cameras to determine distances to surfaces in the environment.

The three-dimensional model of the interior may be used to promote a user visualizing the appearance of the interior when one or more surfaces of the room are painted, visualizing the appearance of the interior with a carpeted floor replaced with a hardwood floor or a tile floor, visualizing the appearance of the interior with an new window installation, or some other remodeling change. For example, an application that executes on the mobile communication device may use the three-dimensional model as input and allow a user to define permutations of existing elements of the interior. The application may allow the user to capture pictures of furniture in the interior and add them to the three-dimensional model. The application may allow the user to interact with the furniture in the virtual reality interior or the augmented reality interior, for example to move the furniture around. The three-dimensional model of the interior may be used to promote a user visualizing a different arrangement of furniture in the interior or visualizing a new furniture item in the interior. For example, the three-dimensional model of the interior may be used to promote a home owner visualizing a new lamp placed on an end table in the interior.

Figure 1:
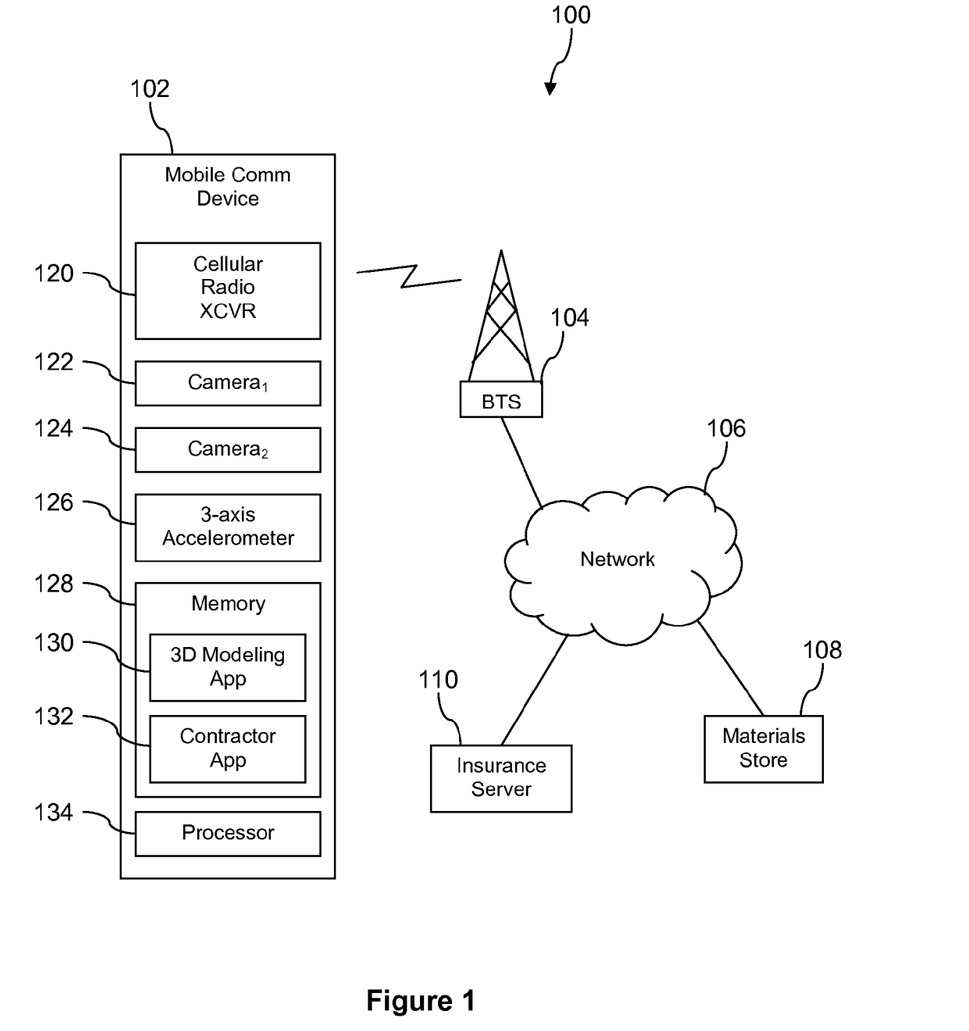
FIG. 1 is a block diagram of a communication system according to an embodiment of the disclosure.

Turning now to FIG. 1, a communication system 100 is described. In an embodiment, the system 100 comprises a mobile communication device 102, a base transceiver station (BTS) 104 or enhanced Node B (eNB), a network 106, a retail store 108, and an application server 110. In an embodiment, the mobile communication device may be a mobile phone, for example a smart phone, a personal digital assistant (PDA), a media player, a wearable computer, or a headset computer. The network 106 may comprise one or more private networks, one or more public networks, or a combination. The retail store 108 may be a paint store, a lumber yard, a home improvement store, a landscaping store, or another store. In an embodiment, the application server 110 may be an insurance application server. The BTS 104 may communicatively couple the device 102 to the network 106, for example by providing a wireless communication link to the device 102. The BTS 104 may communicate with the device 102 with any of a code division multiple access (CDMA), global system for mobile communication (GSM), long term evolution (LTE), or worldwide interoperability for microwave access (WiMAX) wireless communication protocol.

In an embodiment, the mobile communication device 102 comprises a cellular radio transceiver 120, a first digital camera 122, a second digital camera 124, a three axis accelerometer 126, a memory 128, and a processor 134. The cellular radio transceiver 120 may be used to establish a wireless link with the BTS 104 according to one or more of CDMA, GSM, LTE, or WiMAX. The three axis accelerometer 126 outputs an indication of the acceleration of the device 102 in each of three axes of translation. The apertures of the first camera 122 and the second camera 124 are physically separated from each other by a known distance and are substantially collimated or aligned to point to about the same point at a distance. The cameras 122, 124 capture digital images that may be stored in the memory 128 or in a different memory of the device 102.

In an embodiment, the memory 128 stores a three-dimensional modeling application 130 and a user application 132, for example an application that supports contractors estimating materials to be used in completing a building contract or a remodeling contract. When executed by the processor 134, the three-dimensional modeling application 130 processes inputs from the cameras 122, 124 to create a three-dimensional model of an environment, for example a three-dimensional model of an interior room. In an embodiment, the three-dimensional modeling application 130 further processes inputs from the three axis accelerometer 126 to create the three-dimensional model of the interior. In an embodiment, a projector (not shown) of the mobile device 102 may project an orienting image, for example a cross, or a light spot that may be used to orient the cameras 122, 124 toward a corner or other room feature to improve the analysis of the interior.

In an embodiment, a speaker of the mobile communication device 102 may emit a sound or a series of sounds and a microphone of the device 102 may capture a reflection or echo of the emitted sound returned by the interior. Analysis performed on the reflected sound, based on the known emitted sound, may be used to corroborate the model of the interior developed based on the analysis of the images from the cameras 122, 124. In an embodiment, the analysis comprises determining a frequency distribution of the reflected sound and comparing to the known frequency distribution of the emitted sound to draw inferences about the surface texture of portions of the interior, for example to identify a portion of a surface to be glass material, wooden material, plywood material, dry-wall material, metal material, or other material. In an embodiment, the device 102 further comprises an infrared camera (not shown) that may be used to capture an image of a portion of the interior that may be used for identifying a glass surface.

A three-dimensional model of an interior may be stored and/or represented in any of a variety of forms known to those of skill in the art. The three-dimensional model may comprise information that defines lengths and breadths of one or more surfaces. The 3-D model may comprise information that defines a plurality of surfaces and defines the angles of joining or intersection of these surfaces. The 3-D model may further define polygonal areas within surfaces that contain those areas and/or perimeters of areas including the lengths and breadths of those areas. The 3-D model may define characteristics about different portions of the surfaces, for example whether the portions are a glass surface, a wooden surface, a painted surface, a metal surface, and the like. Alternatively the 3-D model may comprise spatial information in a different format. For example, the 3-D model may define surfaces by a plurality of paired distance and angular displacements from a reference, for example using spherical coordinates. In another embodiment, another system for defining the interior may be used.

Figure 2:
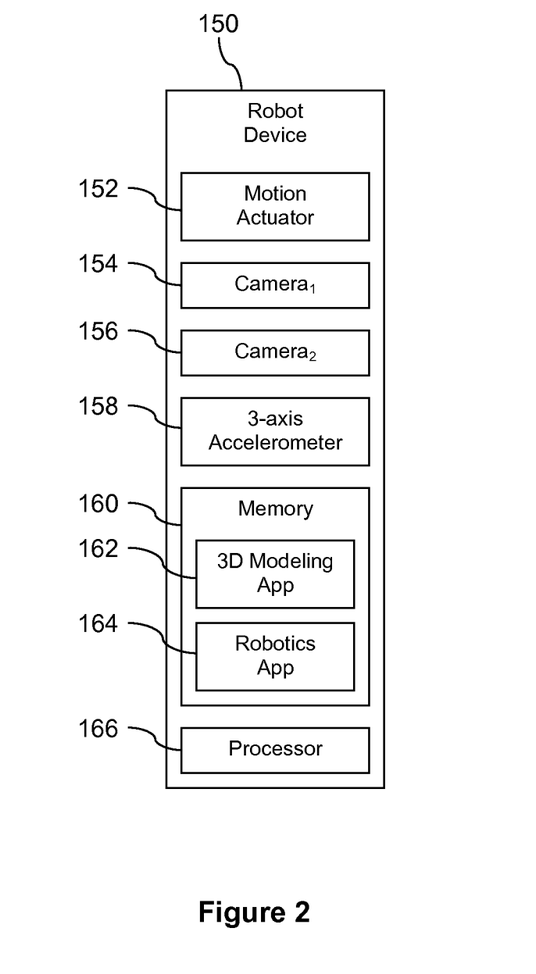
FIG. 2 is a block diagram of a robot according to an embodiment of the disclosure.

Turning now to FIG. 2, a robot device 150 is described. In an embodiment, the robot 150 comprises at least one motion actuator 152, a first camera 154, a second camera 156, a 3 axis accelerometer 158, a memory 160, and a processor 166. The memory may store a three-dimensional modeling application 162 and a robotics application 164. In an embodiment, the cameras 152, 154 may be substantially similar to the cameras 122, 124 described above. Likewise, the 3 axis accelerometer 158 may be substantially similar to the 3 axis accelerometer 126 described above. The 3 dimensional modeling application 162 may be substantially similar to the three-dimensional modeling application 130 described above. The motion actuator 152 may promote moving a portion of the robot 150 relative to another portion of the robot 150—for example moving a head portion of the robot 150 relative to a body portion of the robot 150. The robot device 150 may develop a three-dimensional model of an interior as described above with reference to the mobile communication device 102, for example based on capturing images of an interior with cameras 154, 156 and accelerometer inputs from the 3 axis accelerometer 158 and analyzing by the three-dimensional modeling application 162.

The robot 150 may further comprise a motion actuator (not shown) that promotes self-relocation of the robot 150, for example relocating the robot 150 within in an interior. For example, a self-locating actuator may move the robot past a chair in the interior, around a couch, and through an open doorway into an adjoining room. A robotics application 164 may also be stored in the memory 160 and executed by the processor 166 to perform a variety of robotic tasks such as path mapping, obstacle identification, obstacle avoidance strategizing, and object identification and/or object search. In an embodiment, the robot 150 may receive an instruction to search for an object, for example a misplaced object such as eye glasses, television controller, house keys, or the like.

Figure 3:
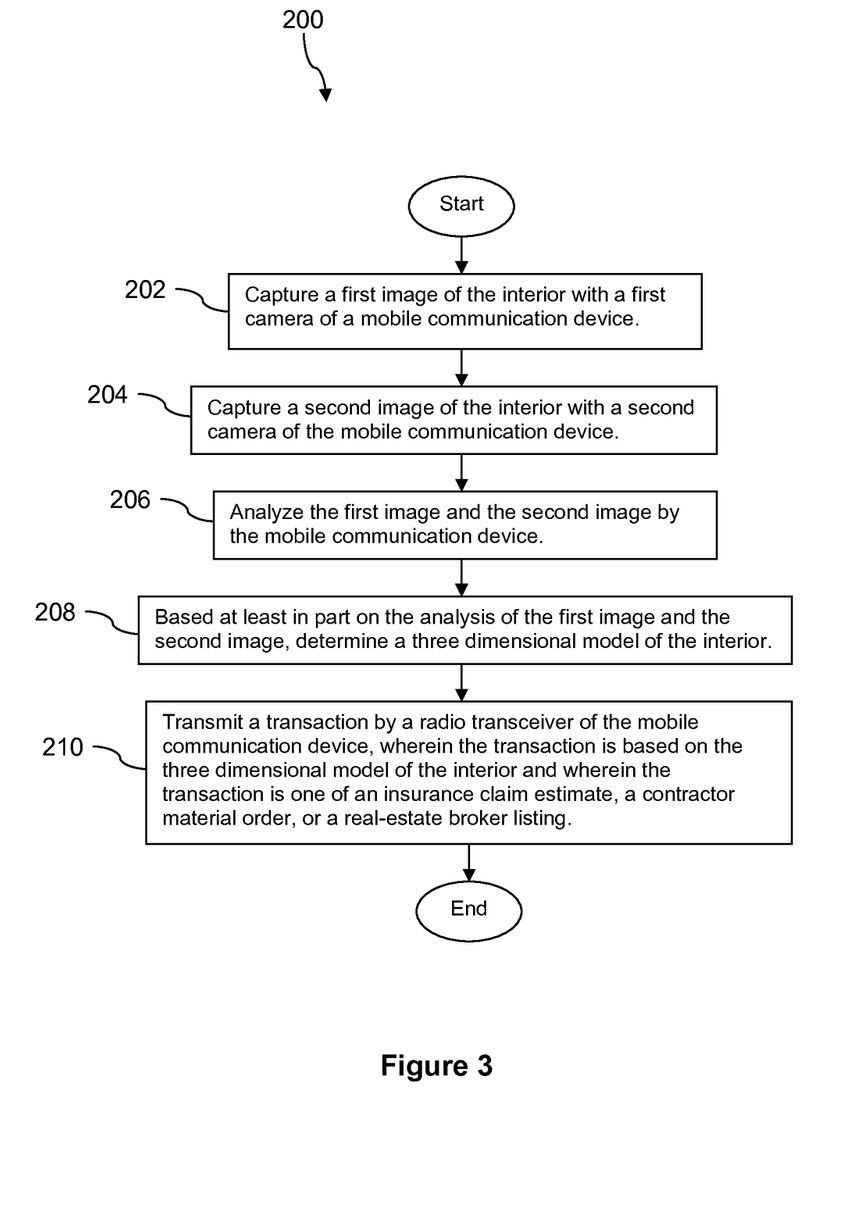
FIG. 3 is a flow chart of a method according to an embodiment of the disclosure.

Turning now to FIG. 3, a method 200 is described. At block 202, a first image of an interior is captured with a first camera of a mobile communication device, for example the mobile device 102 described above with reference to FIG. 1. At block 204, a second image of the interior is captured with a second camera of the device. At block 206, the first and second images are analyzed by the mobile communication device, for example by the three-dimensional modeling application 130 of the mobile communication device 102 of FIG. 1. Analyzing may comprise comparing the two images to identify differences between the images and determine or estimate distances to points of the images based on stereoscopy principles and based on the known distance between the apertures of the cameras 122, 124. At block 208, based at least in part on the analysis of block 206, determine a three-dimensional model of the interior. The three-dimensional model may comprise estimates of the length, breadth, and depth of the surfaces of the interior and a designation of a material of the surfaces of the interior. This three-dimensional model of the interior may identify a plurality of sides or walls of the interior and may further estimate or determine dimensions of each of the sides or walls. The model may further identify different portions of the walls of the interior as being different materials, for example glass portions of a wall, wood portions of a wall, dry-wall portions of a wall, and the like. The mobile communication device may build a transaction based on the three-dimensional model (e.g., based on the estimates of the length, breadth, and depth of the surfaces of the interior and the designation of the material of the surfaces of the interior and possibly based on other attributes or properties of the three-dimensional model). The transaction may be one of an insurance claim for replacement of damage of the interior, a contractor remodeling bid for remodeling at least a portion of the interior, a detailed real-estate listing, or other transaction. At block 210, a transaction is transmitted by a radio transceiver of the mobile communication device, wherein the transaction is based on the three-dimensional model of the interior and wherein the transaction is one of an insurance claim estimate, a contractor material order and/or contractor remodeling bid, or a real-estate listing.

An insurance claim estimate may be created in part by the contractor application 132. In an embodiment, the contractor application 132 may prompt a user of the mobile communication device 102 to input information such as percentage of damage or percentage of damaged area. The contractor application 132 may prompt a user of the mobile communication device 102 to input information identifying a material of a surface or to corroborate or alter an inferred material. The contractor application 132 may generate a claim and transmit the claim via the cellular radio transceiver 120 to the BTS 104 to the network 106 and to the insurance server 110. Alternatively, the contractor application 132 may transmit the three-dimensional model information to the insurance server 110, and the insurance server 110 may generate and submit the insurance claim based on that information.

A real-estate broker listing may be created by the contractor application 132 or another application that collects information on a plurality of interiors, for example a plurality of rooms of a house. The contractor application 132 may prompt the user of the device 102 to input information on quality of a carpet or information on a material of a floor. The contractor application 132 may prompt the user to identify an interior as a room category, for example a bedroom, a kitchen, a bathroom, a living area, a closet, a utility room, a wine cellar, and the like. Additionally the contractor application 132 may prompt the user to identify an interior as an upstairs or a downstairs room or a story of a room, for example a first story room, a second story room, a third story room, etc. The contractor application 132 may prompt the user to identify accoutrements of the room such as crown molding, chair railing, wainscoting, wood paneling, ornamental ceiling reliefs, and the like. The contractor application 132 may prompt the user to designate a grade of quality for one or more features or accoutrements. The real-estate listing may be auto generated by the contractor application 132 and transmitted by the cellular radio transceiver 120 to the BTS 104 to the network 106 and to a real-estate office server (not shown). Alternatively, the information and/or three-dimensional modeling information may be transmitted via the cellular radio transceiver 120 to the real-estate office server, and an application on the real-estate office server may create the subject real-estate listing and add it to a master real-estate listing in near real-time, for example while a real-estate professional is visiting with a home owner.

A contractor such as a painting sub-contractor, a carpenter sub-contractor, a dry-wall subcontractor or other, may use the contractor application 132 to determine an amount of needed material and to place an order with the materials store 108. The materials may be paint, lumber, attachment hardware, masking tape, brushes, and other materials. Additionally, the contractor may use the contractor application 132 to develop a job cost estimate based on the estimated materials and materials cost learned from the materials store 108 in near real-time.

Figure 4:
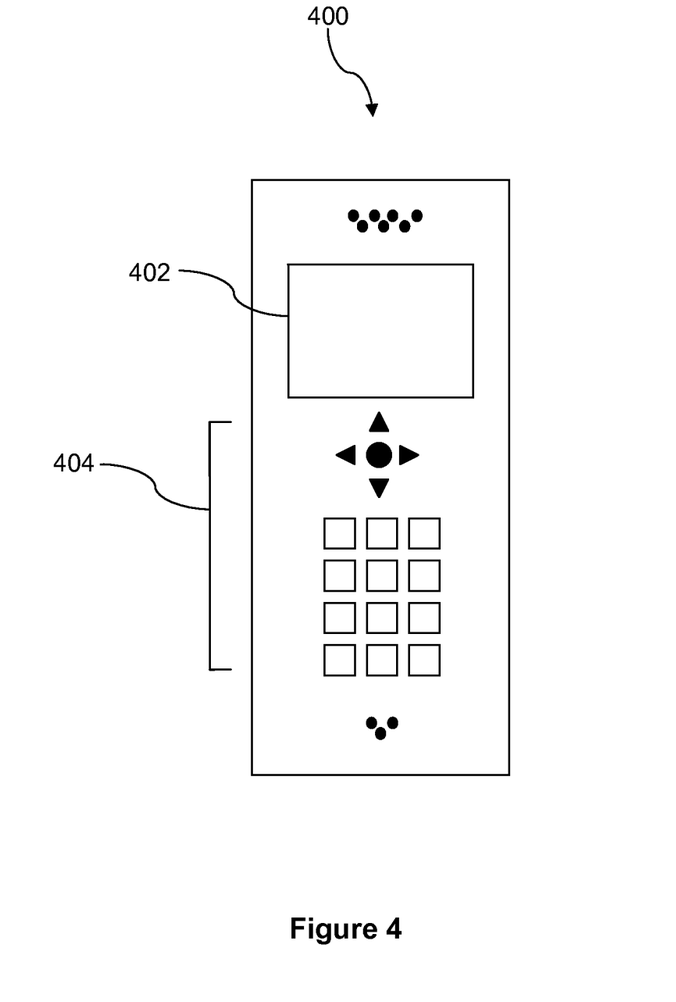
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
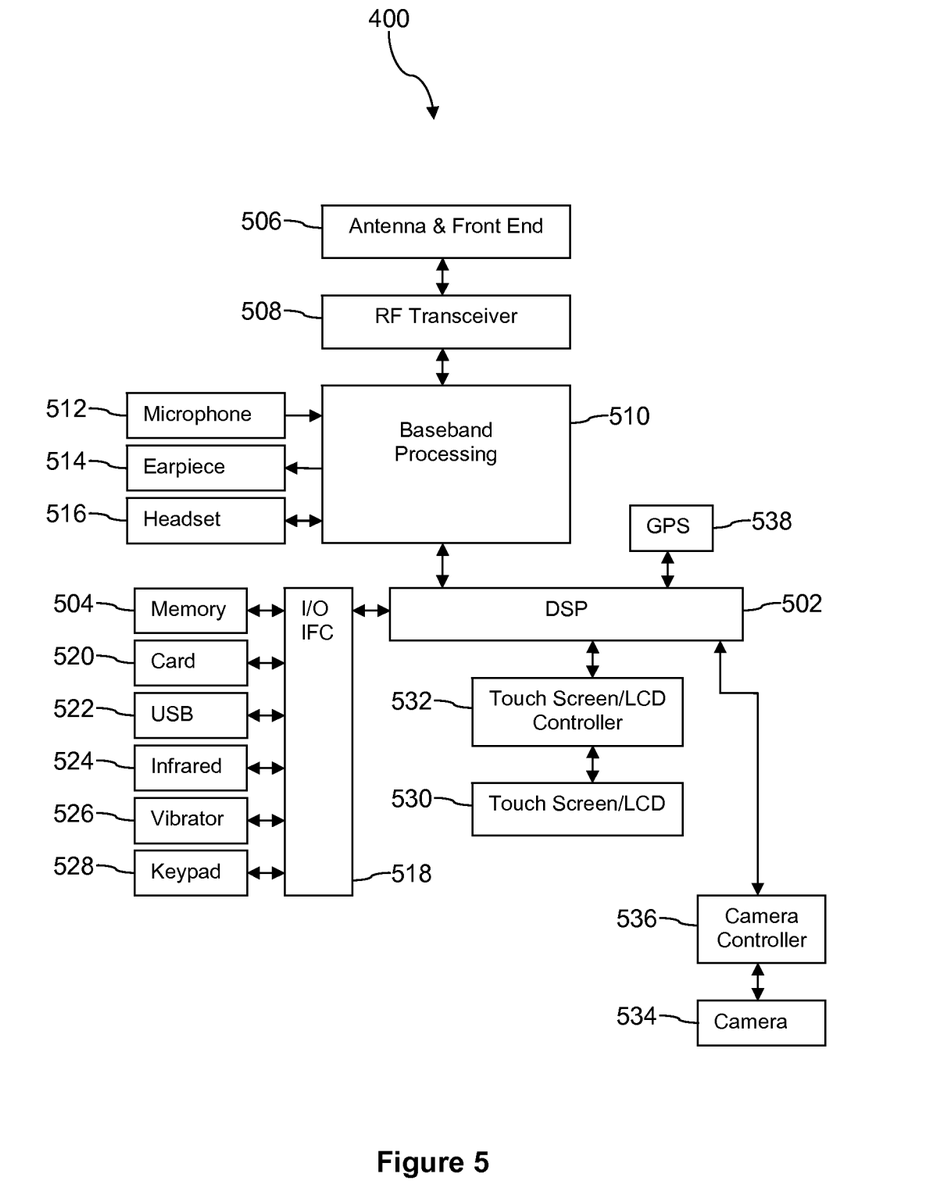
FIG. 5 is a block diagram of a hardware architecture of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
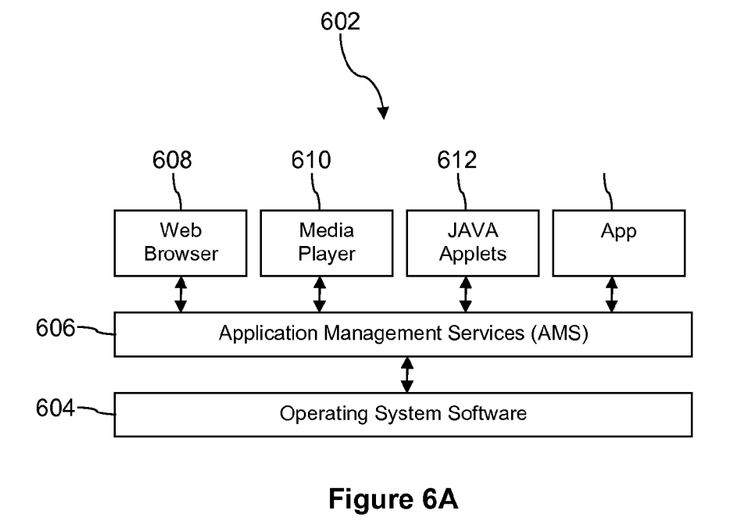
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
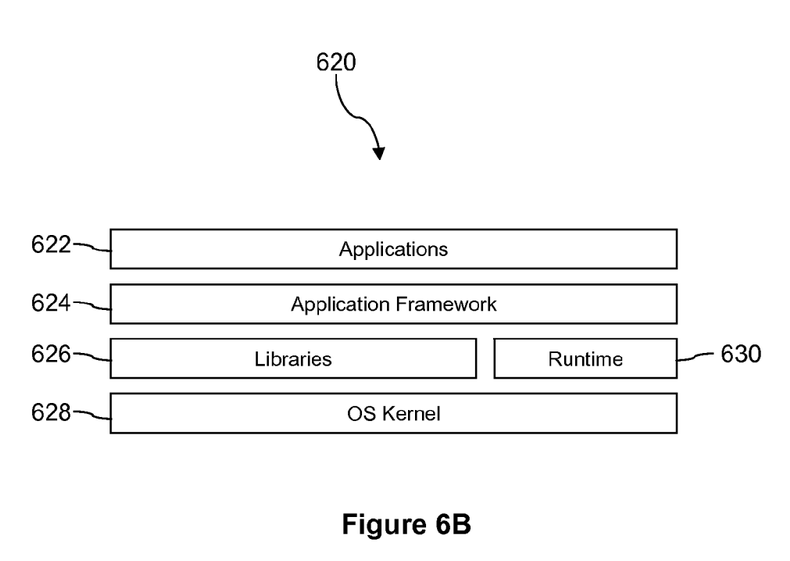
FIG. 6B is a block diagram of a different software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
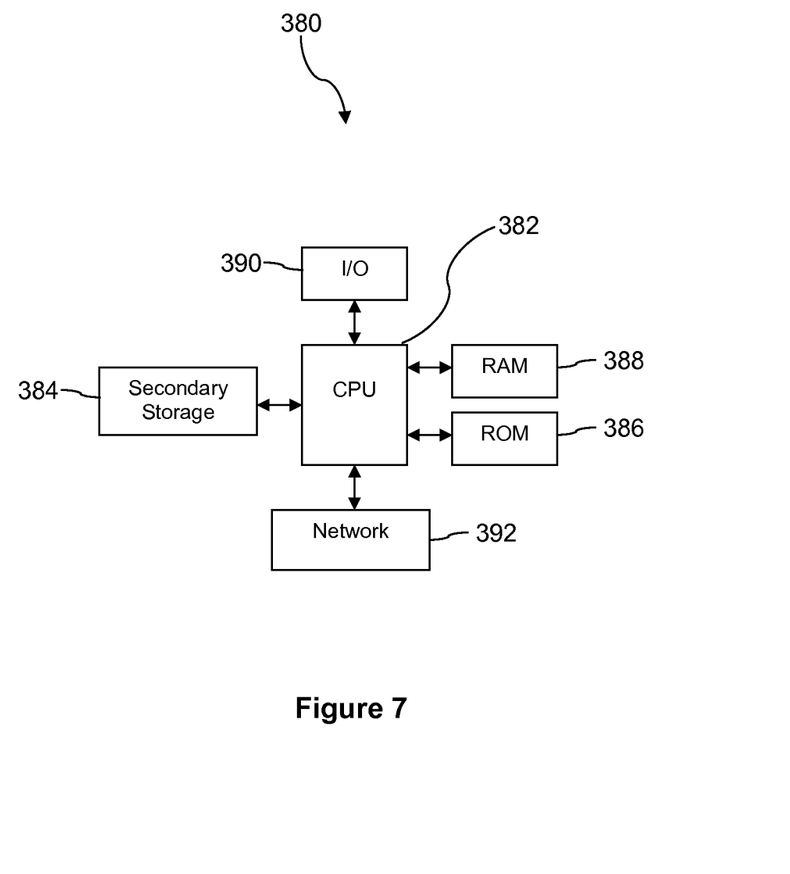
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a radio frequency transceiver;
   a processor;
   a non-transitory memory;
   a first camera;
   a second camera;
   an infrared camera;
   an orientation sensor, wherein the orientation sensor is configured to determine a physical orientation of the mobile communication device when the mobile communication device is located at a location in an interior of a room; and
   an application stored in the non-transitory memory that, when executed by the processor,
      produces an orientation indication based on the determined physical orientation of the mobile communication device within the interior of the room,
      determines, via the orientation sensor, that the mobile device is accelerating in at least one of three orthogonal axes,
      analyzes at least a first image captured by the first camera, at least a second image captured by the second camera, at least a third image captured by the infrared camera, and the orientation indication, determines surfaces characteristics and depth information associated with the interior of the room based on the analysis and determined acceleration, identifies at least one surface in the room as a glass surface based on the analysis of the third image captured by the infrared camera, and develops a three-dimensional model corresponding to the interior of the room based on the analysis, wherein the three dimensional model defines a plurality of surfaces including the at least one surface and designates that the at least one surface is a glass surface.

2. The mobile communication device of claim 1, further comprising:

a second application stored in the memory that, when executed by the processor, creates a transaction request based on the three-dimensional model; and transmits the transaction request via the radio frequency transceiver.

3. The mobile communication device of claim 2, wherein the radio frequency transceiver is a cellular radio frequency transceiver.

4. The mobile communication device of claim 1, wherein the orientation sensor comprises a three axis accelerometer.

5. The mobile communication device of claim 1, further comprising a projector configured to project one of a light spot or an image, whereby the mobile communication device is aligned in preparation for capturing the first image and the second image.

6. The mobile communication device of claim 1, further comprising a touchscreen, wherein the application further presents a view of the three-dimensional model on the touchscreen and prompts for identification of doors and windows in the view.

7. The mobile communication device of claim 1, wherein the application identifies a window in the three-dimensional model based on the third image.

8. The mobile communication device of claim 1, wherein the first and second images are images of the interior of the room.

9. The mobile communication device of claim 8, wherein the three-dimensional model comprises estimates of a length, breadth, and depth of surfaces of the interior and a designation of a material of each of the plurality of surfaces of the interior.

10. The mobile communication device of claim 9, further comprising:

a second application stored in the memory that, when executed by the processor, builds a transaction based on the estimates of the length, breadth, and depth of the surfaces of the interior and the designation of the material of each of the plurality of surfaces of the interior; and transmits the transaction via the radio frequency transceiver.

11. The mobile communication device of claim 10, wherein transmitting the transaction by the radio transceiver comprises the radio transceiver communicating using at least one of a code division multiple access (CDMA) wireless communication protocol, a global system for mobile communication (GSM) wireless communication protocol, a long-term evolution (LTE) wireless communication protocol, or a worldwide access for microwave access (WiMAX) wireless communication protocol.

12. The mobile communication device of claim 10, wherein the transaction is one of an insurance claim for replacement of damage in the interior, a contractor remodeling bid for remodeling at least some of the interior, or a detailed real-estate listing.

13. The mobile communication device of claim 12, wherein the second application, when executed by the processor, further:

determines an amount of material to complete the remodeling bid based on the three-dimensional model, builds a contractor material order based on the amount of material, and transmits the contractor material order via the radio transceiver to complete a purchase transaction with a materials store.

14. The mobile communication device of claim 13, wherein the material comprises paint or lumber.

15. The mobile communication device of claim 13, wherein the determination of the amount of material comprises including a pre-defined amount of extra margin.

16. The mobile communication device of claim 2, wherein the transaction request is for one of an insurance claim for replacement of damage at the location, a contractor remodeling bid for remodeling at the location, a detailed real-estate listing associated with the location, or a landscaping bid for a back yard of a property at the location.

17. The mobile communication device of claim 1, wherein the mobile communication device is one of a mobile phone or a smart phone.

18. The mobile communication device of claim 2, wherein the transaction is for a detailed real-estate listing associate with the location.

19. The mobile communication device of claim 2, wherein the transaction is for an insurance claim for replacement of damage at the location.

\* \* \* \* \*